United States Patent [19]
Blanc et al.

[11] Patent Number: 5,205,848
[45] Date of Patent: Apr. 27, 1993

[54] DEVICE ENSURING FILTRATION AND COMMUNICATION BETWEEN THE ATMOSPHERE AND THE INSIDE OF A CRANKCASE

[75] Inventors: Pierre Blanc, Vaux sur Seine; Jean-Paul Travassac, Saint Germain en Laye, both of France

[73] Assignee: Pall France Services, Saint Germain en Laye Cedex, France

[21] Appl. No.: 858,667

[22] Filed: Mar. 27, 1992

[30] Foreign Application Priority Data

Mar. 29, 1991 [FR] France .................................. 91 03905

[51] Int. Cl.$^5$ ............................................. B01D 46/00
[52] U.S. Cl. ........................................ 55/310; 55/498; 123/41.86
[58] Field of Search ................. 55/310, 498; 123/41.86

[56] References Cited

U.S. PATENT DOCUMENTS 499,351  2/1891  Leipelt et al. ..................... 184/105.1

FOREIGN PATENT DOCUMENTS 0395841  11/1990  European Pat. Off. .
3615397  11/1986  Fed. Rep. of Germany .
3735913  11/1988  Fed. Rep. of Germany .
3938919  12/1990  Fed. Rep. of Germany .
1255642  12/1971  United Kingdom ............. 123/41.86

Primary Examiner—Bernard Nozick
Attorney, Agent, or Firm—James A. Drobile; Robert E. Rosenthal

[57] ABSTRACT

Device ensuring filtration and communication between the atmosphere and a crankcase with oil sump, of the type comprising a housing provided with vents and containing a filter cartridge which defines a volume which communicates, on the one hand, with the outside through a filtering agent, and on the other hand, with the housing, through a vertical passage. The device further comprises internal means for recovering and recycling the oil from the filter medium as well as internal means for placing the housing in direct communication with the atmosphere in case of clogging-up of the filtering agent.

7 Claims, 4 Drawing Sheets

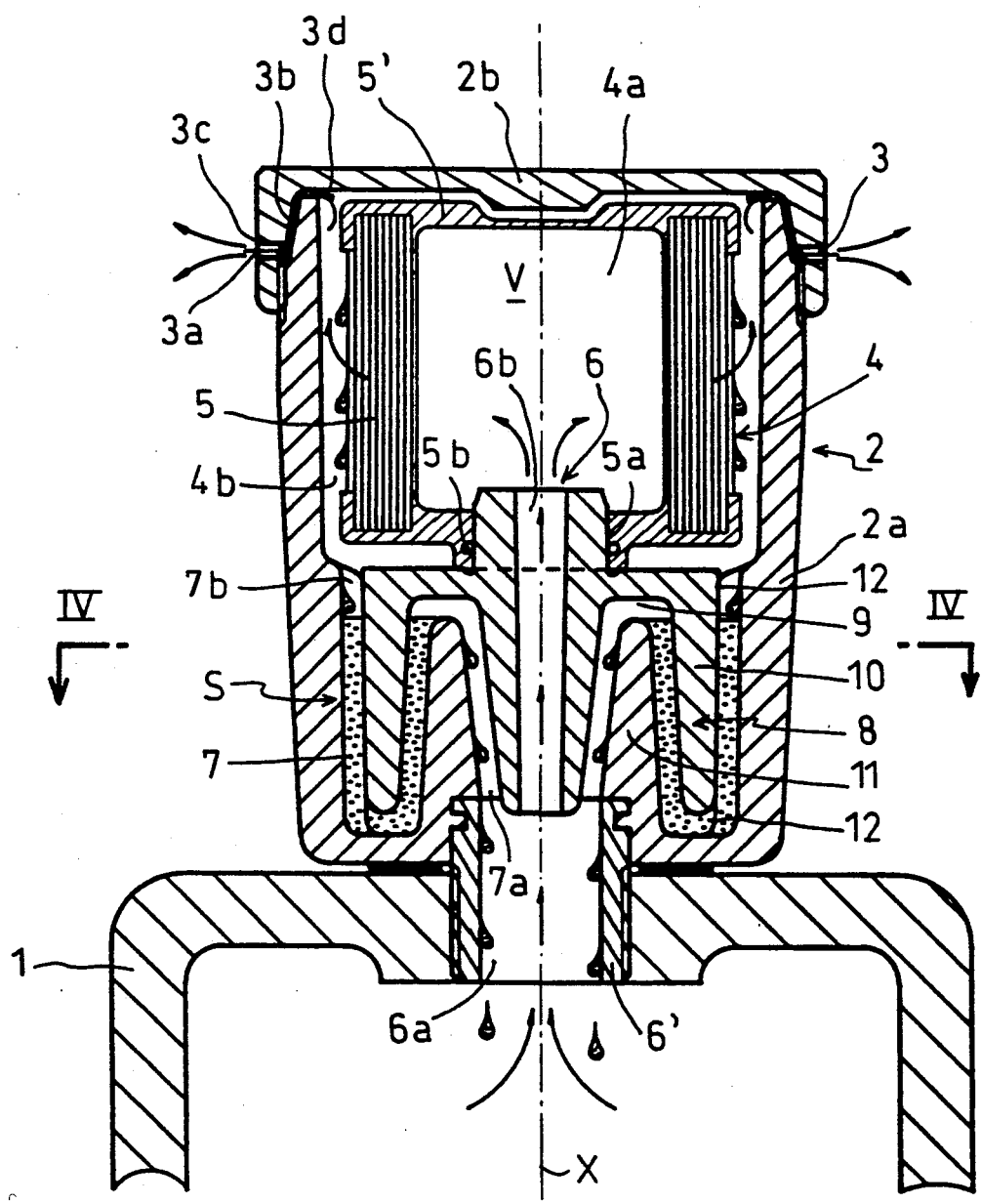
fig_1

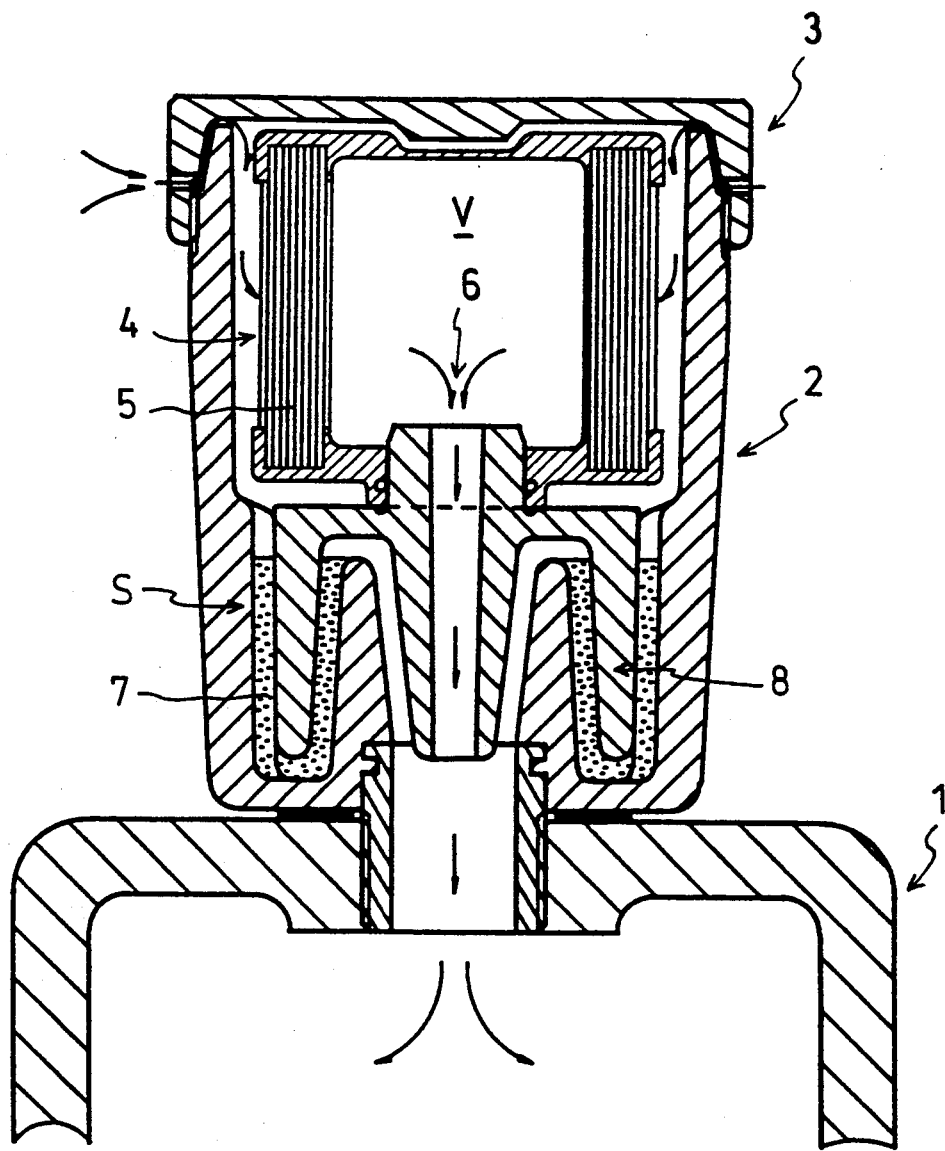
fig_2

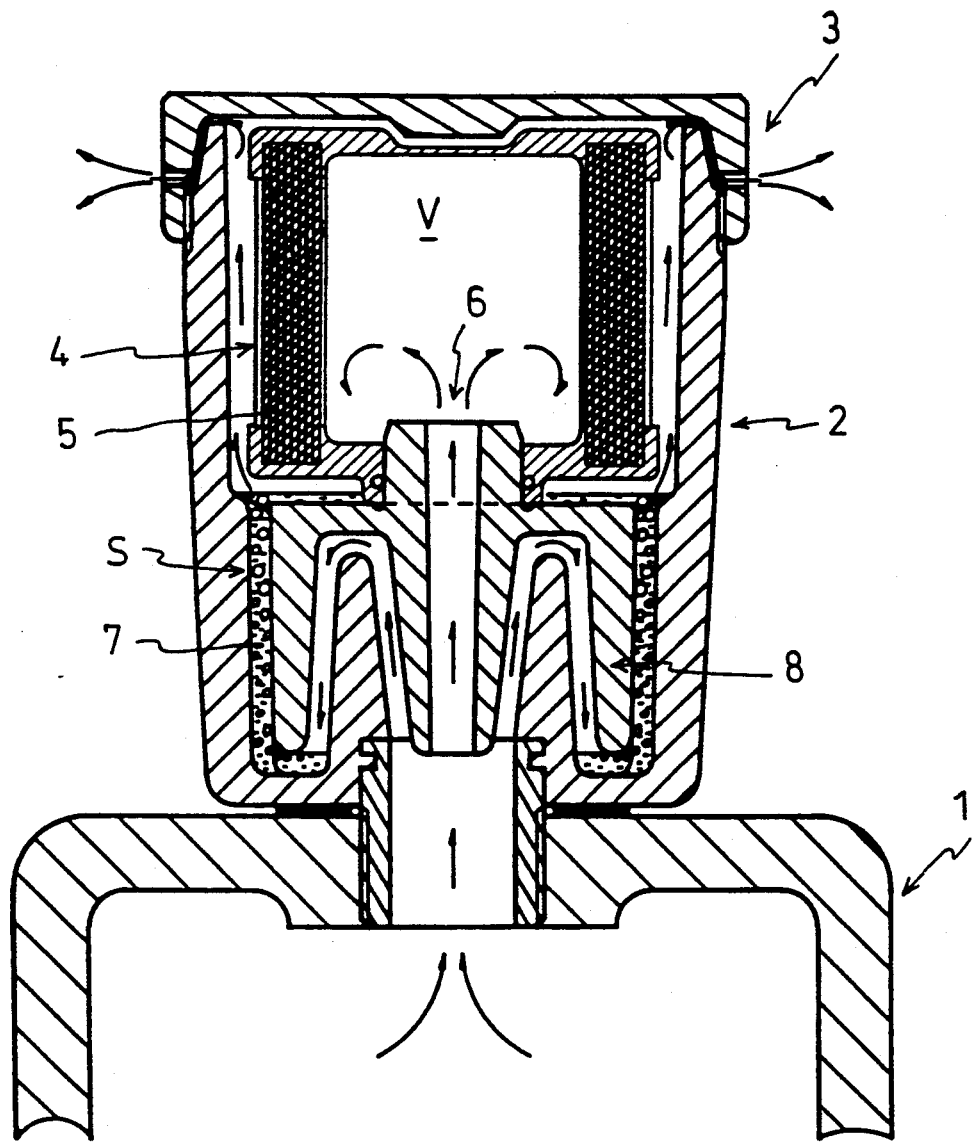
fig_3

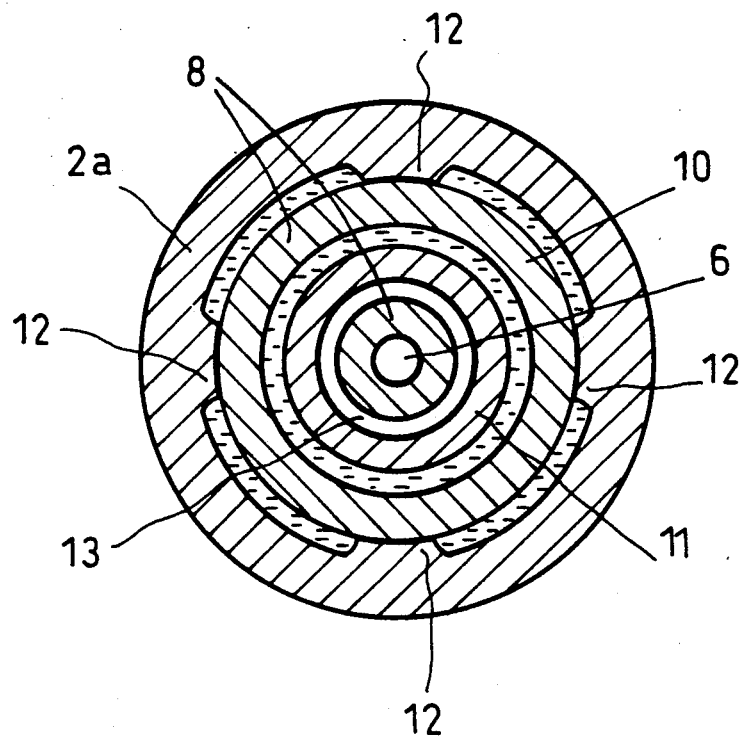
fig_4

DEVICE ENSURING FILTRATION AND COMMUNICATION BETWEEN THE ATMOSPHERE AND THE INSIDE OF A CRANKCASE

FIELD OF THE INVENTION

The present invention relates to a device ensuring filtration and communication between the atmosphere and the inside of a reservoir or a crankcase. When used with a crankcase, this device is often commonly called "breather".

BACKGROUND OF THE INVENTION

Generally speaking, a crankcase is a tight casing which protects, within a closed volume, mechanical elements imparted with movements (such as transmissions, gearboxes, motors, etc . . . ) as well as a lubricant (such as oil, . . . ).

The temperature which prevails inside the crankcase enclosure is relatively high because of the heat released as a result of combustion, heat-conduction, mechanical friction and other phenomena.

This often creates thick mists constituted of gaseous mixtures of air and vaporized oil which must not escape into the atmosphere for fear of polluting the environment and of increasing the consumption of oil.

Concomitantly, the crankcase must be depressurized by opening the enclosure to the atmosphere, so as to avoid the problems linked to possible pressurization caused by the aforesaid overheating. Moreover, if the pressure reduces inside the enclosure due to possible cooling or to a special dynamical effect, this creates an external draught containing particles and an internal ventilation the effect of which can prove damaging to the mechanisms housed inside the crankcase (corrosion, . . . ).

Devices have already been developed, which comprise a housing provided with vents which create a communication with the outside and containing a filter cartridge.

In such devices, the communication between the crankcase and the outside is made through a vertical passageway provided between the crankcase and the housing, through the porous wall of the filter cartridge and through the vents.

In this case, the air goes through the filter cartridge in both directions and in the same manner. Said filter cartridge is generally of paper type. Any stoppage of the droplets of oil mists is virtually inexistant because the phenomenon of coalescence, which consists in regrouping the micro-droplets into large enough drops which can be stopped by gravity from being driven by the air stream, occurs only partly during the passage through the filtering agent. A large part of the oil is thus expelled out of the crankcase through the cartridge, without being recovered.

Also, in the known devices, the vents are generally situated in the lower part of the housing to allow the exhaust towards the outside of any oil drops which have formed in the filtering agent.

Finally, in the event of the cartridge clogging-up, a great difference of pressure can set up between the outside and the inside of the crankcase enclosure and cause breakages or tightness failures.

In the case of a liquid-containing reservoir topped with an air lock, the changes of temperature, pressure or level of the liquid, require in many cases, that the upper part of the reservoir be in communication with the outside. With some easily vaporizable liquids, leaks of liquid mists may occur and pollute the environment. Also, it is often necessary to filter the air entering the reservoir so that it does not contaminate the liquid. The problem to be solved with such reservoirs is the same as that of recycling the oil mists in a crankcase. Affected reservoirs can be liquid storage reservoirs or fermentation reservoirs. For clarity's sake, the only reservoirs referred to hereinafter, are the crankcases with oil sumps.

SUMMARY OF THE INVENTION

It is the object of the present invention to overcome the aforesaid drawbacks or at least to reduce them to a minimum.

This object is reached according to the invention with a device providing filtration and communication between the atmosphere and a reservoir of liquid, notably a crankcase with oil sump, of the type comprising, on the one hand, a housing having an inside cavity and a base equipped with means for securing it on said crankcase, and on the other hand, a filter cartridge placed inside said housing so as to divide said inner cavity into:
- a first chamber communicating with said crankcase through a vertical passageway provided in said base and said crankcase, and
- a second chamber surrounding at least partly said first chamber and communicating with the outside via vents provided in said housing, said cartridge containing a filtering agent placed substantially vertically, characterized in that said vents issue into the upper part of said second chamber, the lower part of said second chamber is not directly communicating with the outside, and said device further comprises internal means for recovering and recycling the oil from the filtering agent, which means are interposed between the lower part of said second chamber and the said crankcase, and branching means for placing said crankcase in direct communication with said second chamber in case of excessive pressure in said crankcase.

According to one advantageous characteristic of the invention said internal oil recovering and recycling means comprise at least one siphon constituted of a conduit of N-shaped vertical section, the lower end of which issues into the vertical passageway while the upper end issues into the lower part of said second chamber.

According to another characteristic, said branching means are constituted by said conduit forming the siphon.

According to yet another characteristic, said filtering agent is of coalescent type.

According to one advantageous embodiment, a cartridge support is provided between the base of said housing and said filter cartridge, housed in the upper part of said housing, which cartridge support has a vertical bore forming the upper part of said vertical conduit. Said cartridge support is provided on its lower face with an annular groove, the open part of which faces downwardly, and a slightly frusto-conical lateral wall tappered at the bottom. The base of the housing comprises an annular rib which is directed towards the inside of the housing and which fits, at least partly, in the annular groove of the cartridge support. Said base further comprises projecting surfaces serving for centering the cartridge support. The siphon is then constituted by the spaces provided between the base and the cartridge support.

Advantageously, the means provided for securing the base on the crankcase comprise an annular sleeve fitted into an opening of said crankcase, said sleeve forming the lower part of the vertical conduit.

With the device according to the invention it is possible to considerably reduce the quantities of oil rejected into the atmosphere, thereby reducing the oil consumption thanks to the recycling principle.

Moreover, in the event of the filtering agent clogging up or of the cartridge malfunctioning, the branching means act as a safety valve and thus protects the crankcase against damages. The device according to the invention is simple, of small volume and it contains no moving parts.

It is inexpensive because constituted of parts which are molded or cast and it is readily fitted on the crankcase. It gives a very good protection against water infiltrations and can be used even when the crankcase works in inclined position. It also ensures an extremely efficient filtration both of the oil mists and of the atmospheric air filled with particles, with only a very low loss of voltage.

In addition, regular operation of the device is ensured by the separation of the oil filtering means from the oil recycling means.

BRIEF DESCRIPTION OF THE DRAWINGS

The present invention will be more readily understood on reading the following description with reference to the accompanying drawings, in which:

FIGS. 1 and 2 are elevational and cross-sectional views showing the device according to the invention in operation in one direction and the other, FIG. 3 is an elevational and cross-sectional view showing the device of FIGS. 1 and 2 with the filter cartridge clogged-up, FIG. 4 is a cross-section along line IV—IV of FIG. 1.

DETAILED DESCRIPTION OF PREFERRED EMBODIMENTS

The device illustrated in the drawings is mounted at the upper part of a crankcase 1 containing oil and mechanical members, not shown, adapted to be imparted with various movements.

This device comprises a housing 2, of cylindrical shape and axis X, constituted of lateral walls 2a which extend from a base, and of a cover 2b which can be removable. The housing 2 is provided with vents 3 allowing the air to flow between the atmosphere and its inside cavity. Said vents 3 are preferably constituted by orifices 3a provided in the lateral edges of the cover 2b and extended through to the inside of the housing by baffles 3b produced by means of channels formed respectively in the inner surface of the lateral edges of the cover 2b and in the outer face of the upper edges of the lateral walls 2a. Said vents 3 are inclined in such a way as to prevent any water from coming in, their outer orifices 3c being situated at a lower level than their inner orifices 3d.

The housing 2 contains in its upper part, a filter cartridge 4 using the principle of separation by coalescence. The cartridge 4 comprises a filtering agent 5 constituted for example of a porous annular wall and it is closed at the top by an upper wall 5'. The cartridge 4 can be removably mounted inside the housing 2 for replacement or cleaning purposes. The filtering agent 5 is preferably coaxial to the housing 2.

The cartridge thus defines a certain inner volume V which communicates, on the one hand, with the outside via the filtering agent 5 and vents 3, and on the other hand, with the crankcase 1 via a vertical passageway 6 issuing into the volume V at the lower part of the cartridge. Said cartridge divides the inside cavity of the housing 2 into two chambers separated by the filtering agent 5, a first chamber 4a communicating with the crankcase 1 via the vertical passageway 6 and a second chamber 4b surrounding at least partly the first chamber 4a and communicating with the outside via the vents 3. As clearly shown on the drawings, the vents 3 issue into the upper part of the second chamber 4b.

The vertical passageway 6 comprises a lower vertical conduit 6a formed through the upper wall of the crankcase 1 and an upper vertical conduit 6b formed in the lower part of the housing 2 and fitting at least partly and coaxially into the lower vertical conduit 6a.

The upper end of the upper conduit 6b can be removably inserted into the cartridge 4 through an orifice 5a provided in the lower wall of said cartridge, tightness being achieved for example by means of an O-ring 5b.

The vertical conduit 6a is formed by the inner conduit of a sleeve 6' fitted in the upper wall of the crankcase 1 and serving as a means for fixing the base of the housing 2.

The diameter of the lower vertical conduit 6a is greater than that of the upper vertical conduit 6b.

The device according to the invention, such as illustrated in FIG. 1, further comprises oil recovering and recycling means.

When the oil contained in the crankcase 1 vaporizes under the effect of internal heat, it blends with the air to form an oil mist which escapes at the upper part of the crankcase 1 through the vertical passageway 6 to fill up the inner volume V of the cartridge 2, as illustrated with arrows in FIG. 2.

The oil is then separated from the air by means of the filtering agent 5, by coalescence, i.e. by re-grouping of the micro-droplets of oil into drops of greater density on which the effect of gravity is greater than the effect of being driven by the gaseous stream.

This phenomenon affects essentially the filtering agent 5, so that the liquid oil can ooze and flow along the outer face of the porous wall, while the clean air is evacuated into the atmosphere through the vents 3.

The liquid oil is thereafter collected by the internal recovering and recycling means located in the lower part of the housing 2. As clearly shown in the drawings, the lower part of the housing 2 is not in direct communication with the outside, since the vents 3 are situated in the upper part of the second chamber 4b.

Said recovery and recycling means comprise a siphon S constituted of at least one conduit 7 of N-shaped vertical section of which the lower end 7a issues into the lower part of the second chamber 4b at the base of and flush with the outer face of the porous wall of the agent 5.

To be more precise, the lower end 7a of the siphon S issues into the vertical conduit 6 between the lower vertical conduit 6a and the upper vertical conduit 6b. The siphon S can be composed of a plurality of conduits of N-shaped section spaced regularly around the vertical axis X common to the cartridge 4, the housing 2 and the vertical passageway 6. It can also be produced by any other known method.

Thus, the siphon conduit fills up with the liquid oil coming from the filtering agent 5 through its upper end 7b until the oil reaches the level of the central branch of the conduit of N-shaped section and then returns to the level of its internal lower end 7a in the crankcase 1 through the vertical passageway 6. In the event of the filtering agent 5 clogging up, as illustrated with arrows in FIG. 3, the inside volume V becomes a closed volume and an excessive pressure may appear between the inside and the outside of the crankcase 1. The oil mist which is under strong pressure then expels the liquid oil contained in the N-shaped conduit 7 of the siphon S.

Said siphon conduit 7, cleared out in this way, creates, in cooperation with the vents 3, an air blast by placing the crankcase 1 in direct communication with the atmosphere, thereby acting as a "safety valve".

The parameters influencing the dimensions given to the siphon S are critical. For example, the section, the length and the height of the branches of the conduit with a N-shaped section are determined as a function of the crankcase, of the thickness of the oil film, of the type of the filtering agent used and of the operating conditions.

If the pressure inside the crankcase reduces, due for example to an interruption in the movement of the mechanical and cooling members, then the flows between the atmosphere and the inside of the crankcase 1 are reversed, as illustrated with arrows in FIG. 2. This situation generates an external draught in the direction of the inside of the housing 2 and both the inside volume V of the cartridge 4 and the crankcase 1 fill with atmospheric air filtered by the agent 5 and therefore cleared of particles that may be harmful.

It would therefore seem that, in those cases illustrated in either FIG. 1 or FIG. 2, the filtering agent 5 has, in order to ensure an efficient filtration in both directions, during the passage of the gases, to show sufficent resistance towards, respectively, streams of oil mists or of atmospheric air filled with particles. Preferably, the filtering agent 5 is so adapted as to be able to stop particles of 2 μm.

Moreover, the device according to the invention can be produced in a plurality of separable parts.

According to an advantageous embodiment, a cartridge support 8 is provided between the base of the housing 2 and the filter cartridge 4 situated in the upper part of the housing 2.

The base of the housing 2 is so shaped as to have, on its upper face, an N-shaped surface of revolution around the vertical axis X. The cartridge support 8 comprises on its lower face a surface which is complementary to that of the base of the housing, and grooves or channels can be provided, in the walls in facing relationship of said base and said cartridge support, in order to constitute the siphon S.

The cartridge support 8 comprises a vertical bore 6b which constitutes the upper part of the vertical conduit 6 and is situated above the sleeve 6'. Preferably, the lower face of the cartridge support 8 comprises an annular groove 9 of which the open part faces downwardly and which is coaxial to the vertical bore 6b, as well as a lateral wall 10 which is slightly frusto-conical and tappered at the bottom.

The base of the housing 2 comprises an annular rib 11 directed towards the inside of the housing 2 and which is at least partly fittable into the annular groove 9. Centering means are interposed between the faces in opposite relationship of the base of housing 2 and of the cartridge support 8. Said centering means are preferably formed by projecting surfaces 12 provided on the lower lateral wall of the housing 2 which is next to the lateral wall 10 of the cartridge support. Said projecting surfaces 12 extend substantially vertically and are regularly spaced around the axis X of the housing 2, and they extend partly towards the bottom of the housing 2 so as to center and support the cartridge support 8.

The spaces provided between the lower part of the housing 2 and the cartridge support 8 constitute the siphon S of the device according to the invention. Preferably, the cartridge support 8 is force-fitted into the lower part of the housing 2, and forms part thereof, the filtering cartridge 4 being then removable as described hereinabove. The annular rib 11 is situated at a distance from the wall of the cartridge support defining the annular groove 9. Thus, the siphon S issues into the vertical conduit 6 via an annular orifice 13 coaxial to the vertical conduit 6 situated above the sleeve 6'.

What is claimed is:

1. Device ensuring filtration and communication between the atmosphere and a liquid reservoir, such as a crankcase with oil sump, of the type comprising, on the one hand, a housing having an inside cavity and a base equipped with means for securing it on said crankcase, and on the other hand, a filter cartridge placed inside said housing so as to divide said inner cavity into:
   a first chamber communicating with said crankcase through a vertical passageway provided in said base and said crankcase, and
   a second chamber surrounding at least partly said first chamber and communicating with the outside via vents provided in said housing, said cartridge containing a filtering agent placed substantially vertically, device wherein said vents issue into the upper part of said second chamber, the lower part of said second chamber is not directly communicating with the outside, and said device further comprises internal means for recovering and recycling the oil from the filtering agent, which means are interposed between the lower part of said second chamber and said crankcase, branching means being provided for placing said crankcase in direct communication with said second chamber in case of excessive pressure in said crankcase.

2. The device claimed in claim 1, wherein said filtering agent is of the coalescent type.

3. The device claimed in claim 1, wherein said housing comprises a cover and said vents are made in the lateral edges of said cover, the outer orifices of said vents being situated at a lower level than their inner orifices.

4. The device claimed in claim 1, wherein said internal oil recovering and recycling means comprise at least one siphon constituted of a conduit of N-shaped vertical section, the lower end of which issues into the vertical passageway while the upper end issues into the lower part of said second chamber.

5. The device claimed in claim 4, wherein said branching means are constituted by said conduit forming the siphon.

6. The device claimed in claim 1, wherein a cartridge support is provided between the base of said housing and said filter cartridge, housed in the upper part of said housing, which cartridge support has a vertical bore forming the upper part of said vertical conduit, said cartridge support comprising on its lower face an annular groove, the open part of which faces downwardly, and a slightly frusto-conical lateral wall tapered at the bottom, the base of the housing comprises an annular rib which is directed towards the inside of the housing and which fits, at least partly, in the annular groove of the cartridge support, said base further comprising projecting surfaces serving for centering the cartridge support, and the siphon being then constituted by the spaces provided between said base and said cartridge support.

7. The device of claim 6, wherein said siphon issues into said vertical conduit through an annular orifice coaxial to said vertical conduit.

* * * * *